United States Patent
Du

(10) Patent No.: US 9,485,644 B2
(45) Date of Patent: Nov. 1, 2016

(54) BASE STATION DEVICE, WIRELESS COMMUNICATION SYSTEM, AND METHOD OF CONTROLLING BASE STATION DEVICE

(71) Applicant: FUJITSU LIMITED, Kawasaki-shi, Kanagawa (JP)

(72) Inventor: Haiqing Du, Yokohama (JP)

(73) Assignee: FUJITSU LIMITED, Kawasak (JP)

(*) Notice: Subject to any disclaimer, the term of this patent is extended or adjusted under 35 U.S.C. 154(b) by 15 days.

(21) Appl. No.: 14/715,850

(22) Filed: May 19, 2015

(65) Prior Publication Data
US 2015/0358797 A1 Dec. 10, 2015

(30) Foreign Application Priority Data

Jun. 9, 2014 (JP) .................... 2014-119084

(51) Int. Cl.
H04W 4/22 (2009.01)
H04W 16/06 (2009.01)
H04W 76/00 (2009.01)

(52) U.S. Cl.
CPC ............. *H04W 4/22* (2013.01); *H04W 16/06* (2013.01); *H04W 76/007* (2013.01)

(58) Field of Classification Search
CPC .... H04W 4/22; H04W 16/06; H04W 76/007
See application file for complete search history.

(56) References Cited

U.S. PATENT DOCUMENTS

2007/0030809 A1* 2/2007 Dayama ................ H04W 28/08
370/237
2007/0121539 A1 5/2007 Kikuchi

FOREIGN PATENT DOCUMENTS

| JP | 2001-128237 | 5/2001 |
|----|-------------|--------|
| JP | 2013-065977 | 4/2013 |
| WO | 2005/039211 | 4/2005 |

OTHER PUBLICATIONS

NTT DOCOMO, Inc., DOCOMO Deploys Two Large-Zone Base Stations in Tokai Region, [online], Sep. 29, 2001, NTT DOCOMO [searched on Apr. 17, 2014], <URL: https://www.nttdocomo.co.jp/info/news_release/2011/09/29_00.html> (with English translation).

SoftBank Mobile Corp., Results of demonstration experiment of a balloon radio relay system, [online], Mar. 1, 2013, SoftBank Mobile Corp. [searched on Apr. 17, 2014], <URL: http://www.softbank.jp/corp/group/sbm/news/press/2013/20130301_01/> (with English translation).

* cited by examiner

*Primary Examiner* — Kashif Siddiqui
*Assistant Examiner* — Minjung Kim
(74) *Attorney, Agent, or Firm* — Fujitsu Patent Center

(57) ABSTRACT

A call processing control unit establishes communication with a first communication network by using a normal interface, and upon receiving a communication request using a second communication network from the first communication network, activates an emergency interface and establishes communication with the second communication network by using the emergency interface. A wireless communication unit and a baseband processing unit communicate with a first terminal device using the first communication network, connect the first terminal device to the first communication network via the call processing control unit and the normal interface, and when the call processing control unit receives a communication request, communicate with a second terminal device using the second communication network and connects the second terminal device to the second communication network via the call processing control unit and the emergency interface.

9 Claims, 13 Drawing Sheets

FIG.3

| | FIRST MME OF SECOND CARRIER | SECOND MME OF SECOND CARRIER | ... | J-TH MME OF SECOND CARRIER |
|---|---|---|---|---|
| BASE STATION OF FIRST CARRIER | ○ | ○ | ... | × |
| BASE STATION OF THIRD CARRIER | ○ | × | ... | ○ |
| ... | ... | ... | ... | ... |
| BASE STATION OF N-TH CARRIER | × | ○ | ... | ○ |

FIG.10

| SUBSCRIBER NAME | IMSI | TA | GPS LOCATION INFORMATION |
|---|---|---|---|
| SUBSCRIBER A | AAA | a | LONGITUDE: 138.35 LATITUDE: 35.30° |
| SUBSCRIBER B | BBB | b | LONGITUDE: 139.67 LATITUDE: 33.20° |
| SUBSCRIBER C | CCC | a | LONGITUDE: 137.54 LATITUDE: 34.50° |

FIG.11

| SUBSCRIBER NAME | IMSI | TA | GPS LOCATION INFORMATION |
|---|---|---|---|
| SUBSCRIBER A | AAA | a | LONGITUDE: 138.35 LATITUDE: 35.30° |
| SUBSCRIBER B | BBB | a | LONGITUDE: 139.67 LATITUDE: 33.20° |

BASE STATION DEVICE, WIRELESS COMMUNICATION SYSTEM, AND METHOD OF CONTROLLING BASE STATION DEVICE

CROSS-REFERENCE TO RELATED APPLICATION

This application is based upon and claims the benefit of priority of the prior Japanese Patent Application No. 2014-119084, filed on Jun. 9, 2014, the entire contents of which are incorporated herein by reference.

FIELD

The embodiments discussed herein are directed to a base station device, a wireless communication system, and a method of controlling the base station device.

BACKGROUND

Recently, a plurality of communication providers provide wireless communication services, such as mobile phone services. The communication providers deploy base station devices in every region in order to establish communication networks that cover communication areas nationwide. Further, each of the communication providers independently deploys each base station device in the same region.

In the communication networks as described above, there is a problem with the continuity of wireless communication services in the event of a major disaster. If a major disaster occurs, base stations and networks deployed in affected areas may be broken, and it may become difficult to continuously provide wireless communication services to users. Communication infrastructures, in particular, mobile communication infrastructures, are lifelines closely connected to normal lives; therefore, the communication providers aim at providing continuous wireless communication services without disconnection even when a disaster or a failure occurs.

For the purpose of providing continuous wireless communication services at the time of a disaster, each of the communication providers independently take countermeasures.

For example, there is a method of deploying a large-zone base station that is not used at normal times but is used at the time of an emergency. The large-zone base station has a greater coverage than an ordinary base station. The large-zone base station does not provide services at normal times, but provides services and ensure the continuity of wireless communication services when an ordinary base station device is unable to provide services due to a disaster or the like.

Further, there is a method of putting a repeater on a balloon after a disaster, floating the repeater at the height of 100 meters, and causing the repeater to relay radio from the ground in order to take over the functions of a broken base station device.

Alternatively, when a base station or a network of a certain communication provider is broken, it may be possible to employ a method of using a system of other communication providers by using roaming in order to continue wireless communication services.

As a technology for wireless communication services, conventional technologies as described below have been proposed. For example, there is a conventional technology for sharing a wireless network with a plurality of communication providers and charging usage fees depending on use. Further, there is a conventional technology for causing a plurality of communication providers to share a wireless unit that communicates with terminals and causing a wireless control unit of each of the communication providers to control the shared wireless unit. Furthermore, there is a conventional technology for complementing deficiencies of functions of a system by borrowing and lending base stations among different communication systems.

Patent Literature 1: International Publication No. 2005/039211

Patent Literature 2: Japanese Laid-open Patent Publication No. 2013-65977

Patent Literature 3: Japanese Laid-open Patent Publication No. 2001-128237

Non Patent Literature 1: NTT DOCOMO, INC., DOCOMO Deploys Two Large-Zone Base Stations in Tokai Region, [online], Sep. 29, 2001, NTT DOCOMO [searched on Apr. 17, 2014], <URL: https://www.nttdocomo.co.jp/info/news_release/2011/09/29_00.html>

Non Patent Literature 2: SoftBank Mobile Corp., Results of demonstration experiment of a balloon moored radio relay system, [online], Mar. 1, 2013, SoftBank Mobile Corp. [searched on Apr. 17, 2014], <URL: http://www.softbank.jp/corp/group/sbm/news/press/2013/20130301_01/>

However, in the method of using a large-zone base station, a large-scale facility is additionally installed, resulting in a large increase in costs. Further, in the method of floating a repeater with a balloon, the repeater and the balloon are delivered to an affected area; however, it may be difficult to promptly deploy the repeater because of degradation of road conditions or the like after a disaster.

Furthermore, in the case of using roaming, it is difficult to reach agreement on roaming among domestic communication providers because of relationships of rights. Therefore, it is difficult for communication systems to interoperate with one another at the time of a disaster under a proper agreement.

Moreover, in the method of sharing a wireless network or a wireless unit with a plurality of communication providers, it is difficult to share the network or the unit among existing communication providers because of the same reason as in the case of roaming; therefore, it is difficult to continuously provide services at the time of a disaster. Furthermore, in the conventional technology for borrowing and lending base stations among communication providers, resources available to the communication providers serving as lenders are reduced, so that wireless communication services may be degraded.

SUMMARY

According to an aspect of an embodiment, a base station device includes: a first interface unit connected to a first communication network; a second interface unit connected to a second communication network; a communication control unit that establishes communication with the first communication network by using the first interface unit, and upon receiving a communication request using the second communication network from the first communication network, activates the second interface unit and establishes communication with the second communication network by using the second interface unit; and a communicating unit that communicates with a first terminal device using the first communication network, connects the first terminal device to the first communication network via the first interface unit, and when the communication control unit receives the communication request, communicates with a second terminal device using the second communication network, and connects the second terminal device to the second communication network via the second interface unit in addition to connection of the first terminal device to the first communication network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a connection relationship table;

FIG. 10 is a diagram illustrating an example of extraction of terminal devices controlled by a service outage base station device;

FIG. 11 is a diagram illustrating another example of extraction of terminal devices controlled by the service outage base station device;

DESCRIPTION OF EMBODIMENTS

Preferred embodiments of the present invention will be explained with reference to accompanying drawings. The base station device, the wireless communication system, and the method of controlling the base station device disclosed in the present application are not limited to the embodiments below.

[a] First Embodiment

Figure 1:
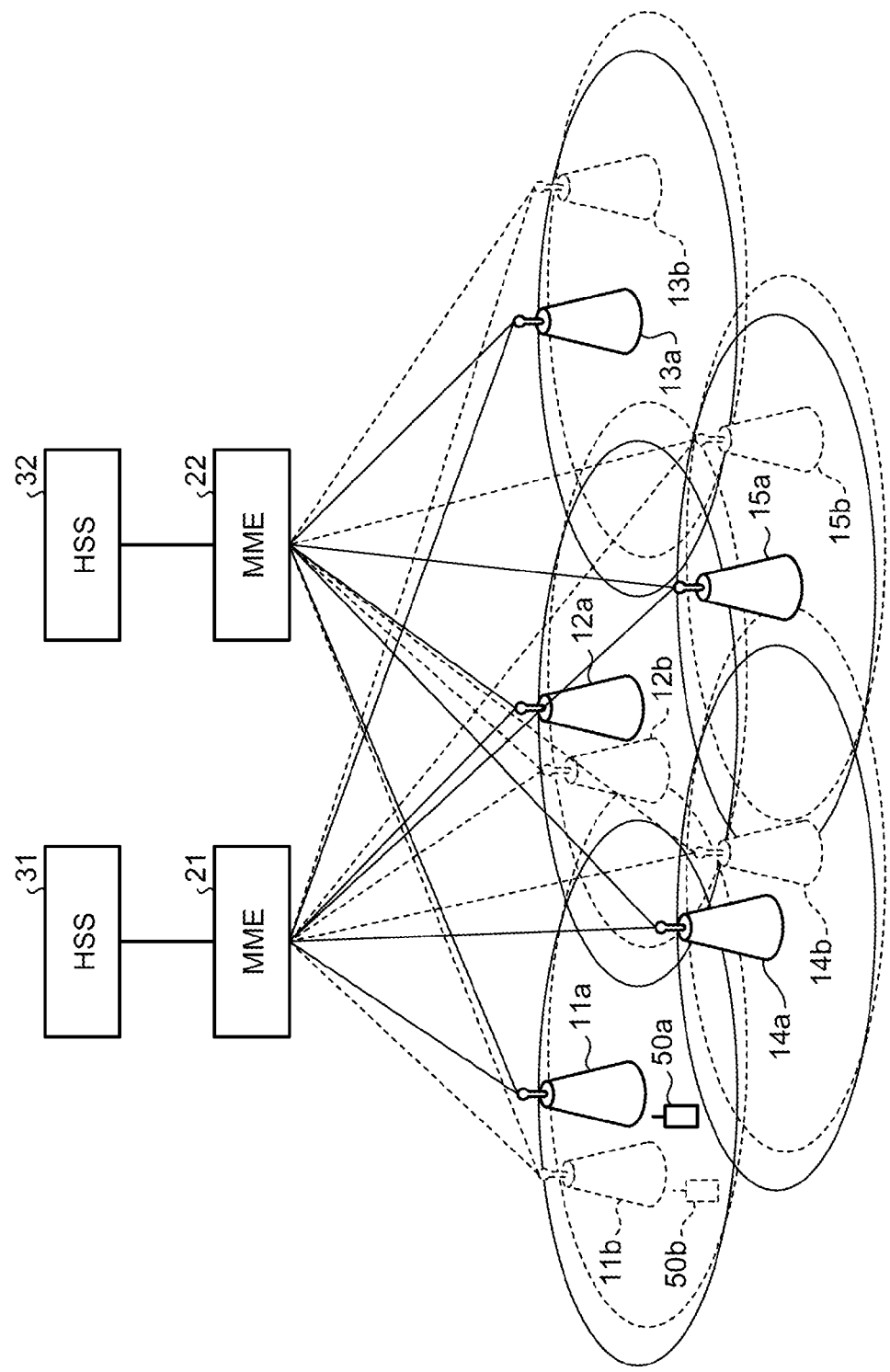
FIG. 1 is a system configuration diagram of a wireless communication system according to a first embodiment.

FIG. 1 is a system configuration diagram of a wireless communication system according to a first embodiment.

FIG. 1 illustrates a case in which communication networks of two communication providers are mixed. The communication providers may be referred to as "carriers". Hereinafter, the two communication providers are described as a first carrier and a second carrier. Further, a wireless communication network of the first carrier is referred to as a first communication network, and a wireless communication network of the second carrier is referred to as a second communication network. In the explanation below, a Long Term Evolution (LTE) is described as an example of a communication system.

A communication system of the first carrier includes base station devices 11a to 15a, a Mobility Management Entity (MME) 21, and a Home Subscriber Server (HSS) 31. A communication system of the second carrier includes base station devices 11b to 15b, an MME 22, and an HSS 32. The base station devices 11b to 15b and connections between the base station devices 11b to 15b and the MMES 21 and 22 are illustrated by dashed lines for the sake of clarification.

The communication system includes, although not illustrated in FIG. 1, a Serving Gateway (S-GW) and a Packet data network Gateway (P-GW). The S-GW performs routing of signals from a terminal device 50a and transfers the signals. The P-GW is a gateway connected to an external network.

The MME 21, the S-GW, the P-GW, and the HSS 31 correspond to examples of a higher-level node device of the base station devices 11a to 15a. Hereinafter, the MME 21, the S-GW, and the P-GW may be collectively and simply referred to as a "higher-level node".

The terminal device 50a in FIG. 1 is a wireless communication device used by subscribers of the first carrier. The terminal device 50a performs communication by using the first communication network. A terminal device 50b is a wireless communication device used by subscribers of the second carrier. The terminal device 50b performs communication by using the second communication network. The terminal device 50b is illustrated by a dashed line in consistency with the base station devices 11b to 15b.

The communication system of the first carrier and the communication system of the second carrier have the same functions. Therefore, an example will be described below in which the communication system of the second carrier stops providing services of the base station devices 11b to 13b, and the base station devices 11a to 13a of the first carrier provide emergency services.

The terminal device 50a transmits a communication request to the base station device 11a. Subsequently, the terminal device 50a receives a reply from the base station device 11a, and establishes a connection for wireless communication. Then, the terminal device 50a performs communication by using the first communication network.

The terminal device 50b supports a multi-band or a multi-carrier that enables communication using a plurality of different frequency bands. For example, the terminal device 50b transmits a communication request to the base station device 11b at normal times. Subsequently, the terminal device 50b receives a reply from the base station device 11b, and establishes a connection for wireless communication. Then, the terminal device 50b performs communication by using the second communication network.

Further, when the base station devices 11b to 13b stop providing services, and if the terminal device 50b is located in an area corresponding to communication areas of the base station devices 11b to 13b, the terminal device 50b communicates with a neighboring base station device among the base station devices 11a to 13a.

Next, the base station devices 11a to 15a will be described. The base station devices 11a to 15a have the same functions. Therefore, hereinafter, the base station devices 11a to 15a are referred to as a "base station device 10" when they need not be distinguished from one another.

Figure 2:
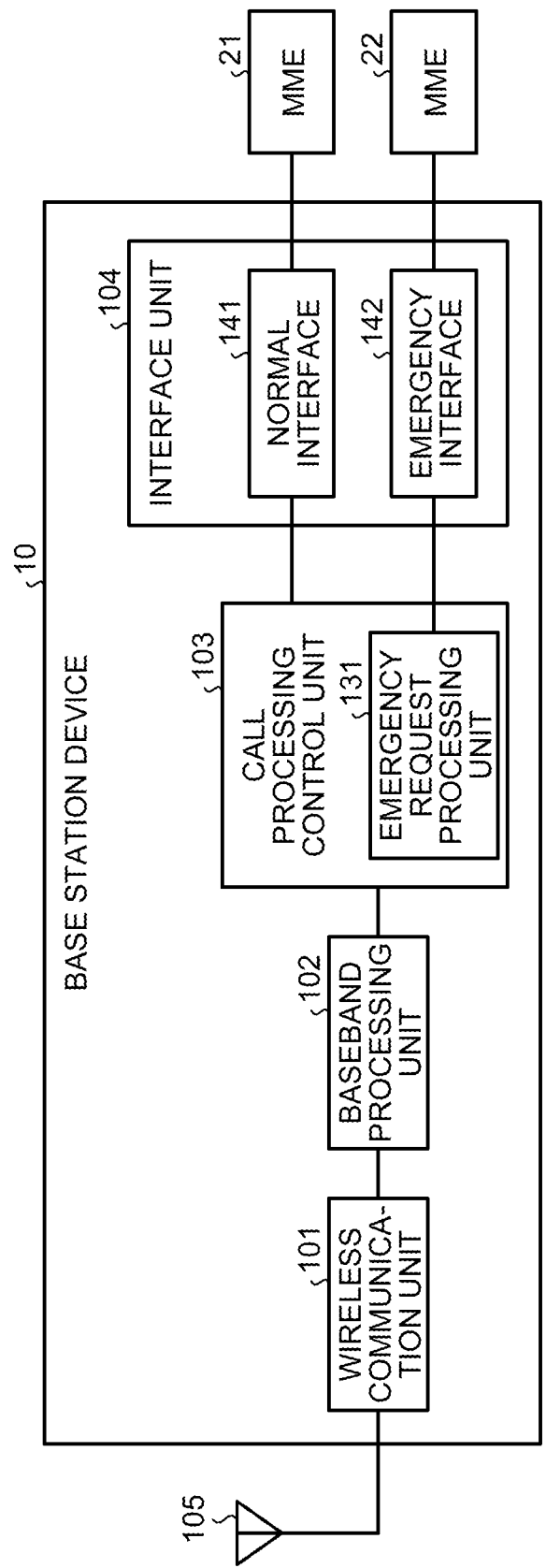
FIG. 2 is a block diagram of a base station device according to the first embodiment.

FIG. 2 is a block diagram of a base station device according to the first embodiment. The base station device 10 includes a wireless communication unit 101, a baseband processing unit 102, a call processing control unit 103, an interface unit 104, and an antenna 105.

The wireless communication unit 101 receives a wireless signal from the terminal device 50a located within a communication area thereof, via the antenna 105. Subsequently, the wireless communication unit 101 demodulates the received wireless signal and generates a baseband signal. Then, the wireless communication unit 101 outputs the generated baseband signal to the baseband processing unit 102.

Further, the wireless communication unit 101 receives, from the baseband processing unit 102, input of a baseband signal transmitted from the MME 21 or the like. Subsequently, the wireless communication unit 101 modulates the received baseband signal and generates a wireless signal. Then, the wireless communication unit 101 outputs the generated wireless signal to the terminal device 50a via the antenna 105.

The baseband processing unit 102 receives input of a baseband signal of uplink communication from the wireless communication unit 101. The baseband processing unit 102 performs fast Fourier transform on the received baseband signal, demodulates data, and performs error correction. Subsequently, the baseband processing unit 102 outputs the baseband signal subjected to the various processes to the call processing control unit 103.

Further, the baseband processing unit 102 receives input of a baseband signal of downlink communication from the call processing control unit 103. The baseband processing unit 102 performs error correction, modulates data, and further performs inverse fast Fourier transform on the received baseband signal. Subsequently, the baseband processing unit 102 outputs the baseband signal subjected to the various processes to the wireless communication unit 101.

The wireless communication unit 101 and the baseband processing unit 102 correspond to examples of a "communication unit".

The interface unit 104 includes a normal interface 141 and an emergency interface 142. The normal interface 141 is an interface connected to the MME 21 provided in the communication system of the first carrier. The emergency interface 142 is an interface connected to the MME 22 provided in the communication system of the second carrier.

For example, a 100Base-T Ethernet (registered trademark) may be used as the normal interface 141. For example, a device of an impulse radio system or the like may be used as the emergency interface 142. If a device of an impulse radio system is used as described above, it becomes possible to reduce the size and weight of the emergency interface 142 and realize low power consumption, enabling to reduce operation and maintenance costs.

The normal interface 141 is activated with activation of the base station device 10. The normal interface 141 is a communication interface between a higher-level node device of the communication system of the first carrier including the MME 21 and the base station device 10. The normal interface 141 transmits a signal received from the call processing control unit 103 to the higher-level node device of the communication system of the first carrier. Further, the normal interface 141 transfers a signal received from the higher-level node device of the communication system of the first carrier to the call processing control unit 103. The normal interface 141 corresponds to an example of a "first interface unit".

In contrast, the emergency interface 142 is a communication interface between a higher-level node device of the communication system of the second carrier including the MME 22 and the base station device 10. The emergency interface 142 is activated in response to an activation request from an emergency request processing unit 131 of the call processing control unit 103 at the time of an emergency. The emergency interface 142, when being normally activated, outputs a reply indicating that emergency communication is available to the emergency request processing unit 131. The emergency interface 142 transmits a signal received from the call processing control unit 103 to the higher-level node device of the communication system of the second carrier. Further, the emergency interface 142 transfers a signal received from the higher-level node device of the communication system of the second carrier to the call processing control unit 103. The emergency interface 142 corresponds to an example of a "second interface unit".

The call processing control unit 103 communicates with the higher-level node device by using the normal interface 141 and the emergency interface 142. At a normal time other than at the time of an emergency, the call processing control unit 103 performs processes as described below by using the normal interface 141.

The call processing control unit 103 performs a call control process including a call, a reply, a disconnection, a handover, and the like related to communication with the terminal device 50a, by using the normal interface 141. Specifically, in the case of uplink communication, the call processing control unit 103 transmits identification information on the terminal device 50a or the like to the MME 21 via the normal interface 141. Subsequently, if the terminal device 50a is authenticated by the HSS 31, the call processing control unit 103 calls up a destination of a signal via the normal interface 141 and sets a call. Further, the call processing control unit 103 sends a reply in response to the call to the terminal device 50a via the normal interface 141. If the call is set, the call processing control unit 103 processes a baseband signal received from the baseband processing unit 102, and transmits a control signal to a device on the core network side via the normal interface 141. Further, the call processing control unit 103 processes a control signal received from the MME 21, and outputs the processed signal to the baseband processing unit 102. When being instructed to disconnect the set call, the call processing control unit 103 disconnects the set call. Further, the call processing control unit 103 instructs the baseband processing unit 102 to start or stop operation depending on a result of the call control process.

Next, functions of the call processing control unit 103 in the case of an emergency will be described. In the case of an emergency, the call processing control unit 103 receives a request to activate the emergency interface 142 from the MME 21 via the normal interface 141. In addition, the call processing control unit 103 receives a Globally Unique MME Identifier (GUMMEI) as an identification number of the MME 22 via the normal interface 141.

The emergency request processing unit 131 of the call processing control unit 103 transmits an emergency communication request to the emergency interface 142 in response to the request to activate the emergency interface 142. Subsequently, if the emergency interface 142 is normally activated, the emergency request processing unit 131 receives, from the emergency interface 142, a reply indicating that emergency communication is available. Thereafter, the call processing control unit 103 transmits a reply indicating that the emergency interface 142 is activated to the MME 21 belonging to the communication system of the first carrier. Further, the call processing control unit 103 transmits an E-UTRAN Cell Global ID (ECGI) of the subject base station device 10 to the MME 21.

Subsequently, the emergency request processing unit 131 transmits the emergency communication request to the MME 22 belonging to the communication system of the second carrier via the emergency interface 142. Thereafter, the emergency request processing unit 131 receives, from the MME 22, a reply indicating that emergency communication is available, as a reply to the emergency communication request.

The emergency request processing unit 131 performs a call control process including a call, a reply, a disconnection, a handover, and the like related to communication with the terminal device 50b, by using the emergency interface 142. This process is the same as the call control process that the call processing control unit 103 performs on the terminal device 50a by using the normal interface 141.

In the case of an emergency, the call processing control unit 103 receives connection requests (ATTACH REQUEST) from both of the terminal device 50a of the first carrier and the terminal device 50b of the second carrier. The connection request contains a parameter called Evolved Packet System (EPS) mobile Identity. The EPS mobile Identity contains a Mobile Network Code (MNC) as information indicating which of communication systems of carriers is used by a terminal device that has transmitted the connection request.

The call processing control unit 103 analyzes the connection request and acquires the MNC contained in the connection request. If the MNC indicates the first carrier, the call processing control unit 103, by using the normal interface 141, notifies the MME 21 of the connection request, sets a call, or performs a handover using the higher-level node device of the communication system of a first carrier. If the MNC indicates the second carrier, the call processing control unit 103, by using the emergency interface 142, notifies the MME 22 of the connection request, sets a call, or performs a handover using the higher-level node device of the communication system of a second carrier.

Further, if the call processing control unit 103 receives an instruction to stop an emergency service from the MME 21 via the normal interface 141 while performing call control by using the emergency interface 142 at the time of an emergency, the call processing control unit 103 stops the call control for subscribers of the second carrier. Subsequently, the call processing control unit 103 notifies the MME 21 of stoppage of the emergency service, via the normal interface 141. Further, the emergency request processing unit 131 notifies the MME 22 of stoppage of the emergency service, via the emergency interface 142. Then, the call processing control unit 103 stops the emergency interface 142. The call processing control unit 103 corresponds to an example of a "communication control unit".

Next, the MME 21, the HSS 31, and the MME 22 will be described. In the following, as an example of emergency, a case will be described in which the base station devices 11b to 13b of the second carrier are stopped due to occurrence of a major disaster.

The HSS 31 includes a database for managing user information, such as a mobile phone number or a terminal identification number, on the terminal device 50a of the first carrier. The HSS 31 authenticates the terminal device 50a by using the user information. Further, the HSS 31 registers a location of the terminal device 50a.

The MME 21 receives a control signal from the base station device 10. The MME 21 controls settings of a communication channel with the terminal device 50a. Further, the MME 21 performs a handover of the terminal device 50a.

Functions of the MME 21 at the time of an emergency such as at the time of a disaster will be described below. If the base station devices 11b to 13b stop, communication services are not provided to the terminal device 50b in the communication areas of the base station devices 11b to 13b in the communication system of the second carrier. Therefore, in the wireless communication system according to the first embodiment, the base station devices 11a to 13a with communication areas that cover the communication areas of the base station devices 11b to 13b but that do not cover communication areas of other base station devices, such as base station devices 14b and 15b, perform communication for the terminal device 50b. Hereinafter, the base station devices 11b to 13b that stop providing services are referred to as the service outage base station devices 11b to 13b.

The MME 21 stores therein an overlapping relationship among the communication areas of the base station devices 11a to 15a and the communication areas of the base station devices 11b to 15b. In the first embodiment, the base station devices 11a to 15a are described as examples. However, in reality, the MME 21 stores therein an overlapping relationship among all of base station devices connected to the MME 21 and communication areas of base station devices of other carriers that cover the communication areas of all of the base station devices.

In the first embodiment, the MME 21 determines the base station device 10 that performs an emergency process, by using the overlapping relationship among the communication areas; however, a method of determining the base station device 10 that performs an emergency process is not limited to this example. For example, the MME 21 may store therein the corresponding base station device 10 for each of the base station devices 11b to 15b of the second carrier, and may extract the base station device 10 corresponding to the service outage base station devices 11b to 13b.

The MME 21 receives an emergency processing request and information on the service outage base station devices 11b to 13b from the MME 22. In addition, the MME 21 receives a GUMMEI of the MME 22 that is the higher-level node of the service outage base station devices 11b to 13b.

Then, the MME 21 extracts the base station devices 11a to 13a with communication areas that cover the communication areas of the base station devices 11b to 13b but that do not cover communication areas of other base station devices, such as the base station devices 14b and 15b, by using the overlapping relationship among the communication areas. The MME 21 transmits a request to activate the emergency interface 142 to the extracted base station devices 11a to 13a. Further, the MME 21 transmits the GUMMEI of the MME 22 to the extracted base station devices 11a to 13a.

Subsequently, the MME 21 receives activation of the emergency interface 142 from the base station devices 11a to 13a. Further, the MME 21 receives ECGIs of the base station devices 11a to 13a. Thereafter, similarly to the normal case, the MME 21 controls settings of a communication channel and performs a handover process on the terminal device 50a that uses the first carrier.

Subsequently, upon receiving a notice of restoration of the base station devices 11b to 15b from the MME 22, the MME 21 instructs the base station devices 11a to 15a to stop emergency services. Then, the MME 21 receives replies indicating that the services are stopped from the base station devices 11a to 15a, and finishes providing the emergency services.

The MME 22 stores therein a connection relationship table 201 indicating connection relationships between the base station devices 11a to 15a and 11b to 15b and the MMES 21 and 22 of the respective carriers as illustrated in FIG. 3. FIG. 3 is a diagram illustrating an example of the connection relationship table.

The MME 22, upon occurrence of a disaster, specifies the service outage base station devices 11b to 13b. Subsequently, the MME 22 specifies, from the connection relationship table 201, which base station device of which carrier is connected to the MME 22. For example, if the MME 22 is a first MME of the second carrier in FIG. 3, the MME 22 specifies base station devices of the first and the third carriers as connection destinations of the MME 22. Then, the MME 22 selects a single carrier from among the specified carriers. In the first embodiment, the first carrier is selected. The MME 22 transmits information on the specified one of the service outage base station devices 11b to 13b and an emergency processing request to the MME 21.

Thereafter, the MME 22 receives an emergency communication request from the base station devices 11a to 13a. The MME 22 returns an emergency communication reply to the base station devices 11a to 13a serving as transmission sources of the emergency communication request. In this case, if a communication request is not transmitted from the base station devices 11a to 13a of the first carrier for example, the MME 22 selects a different carrier including a base station to which the MME 22 is connected, and sends a request to provide an emergency service.

Subsequently, the MME 22 performs authentication, registers a location, controls settings of a communication channel, and performs a handover process on the terminal device 50b that uses the second carrier, via the base station devices 11a to 13a.

Thereafter, if the service outage base station devices 11b to 13b are restored and become available, the MME 22 transmits a notice of restoration of the base station devices 11b to 15b to the MME 21.

Then, the MME 22 receives a notice indicating stoppage of the services from the base station devices 11a to 13a, and confirms that provision of the emergency services is completed.

Figure 4:
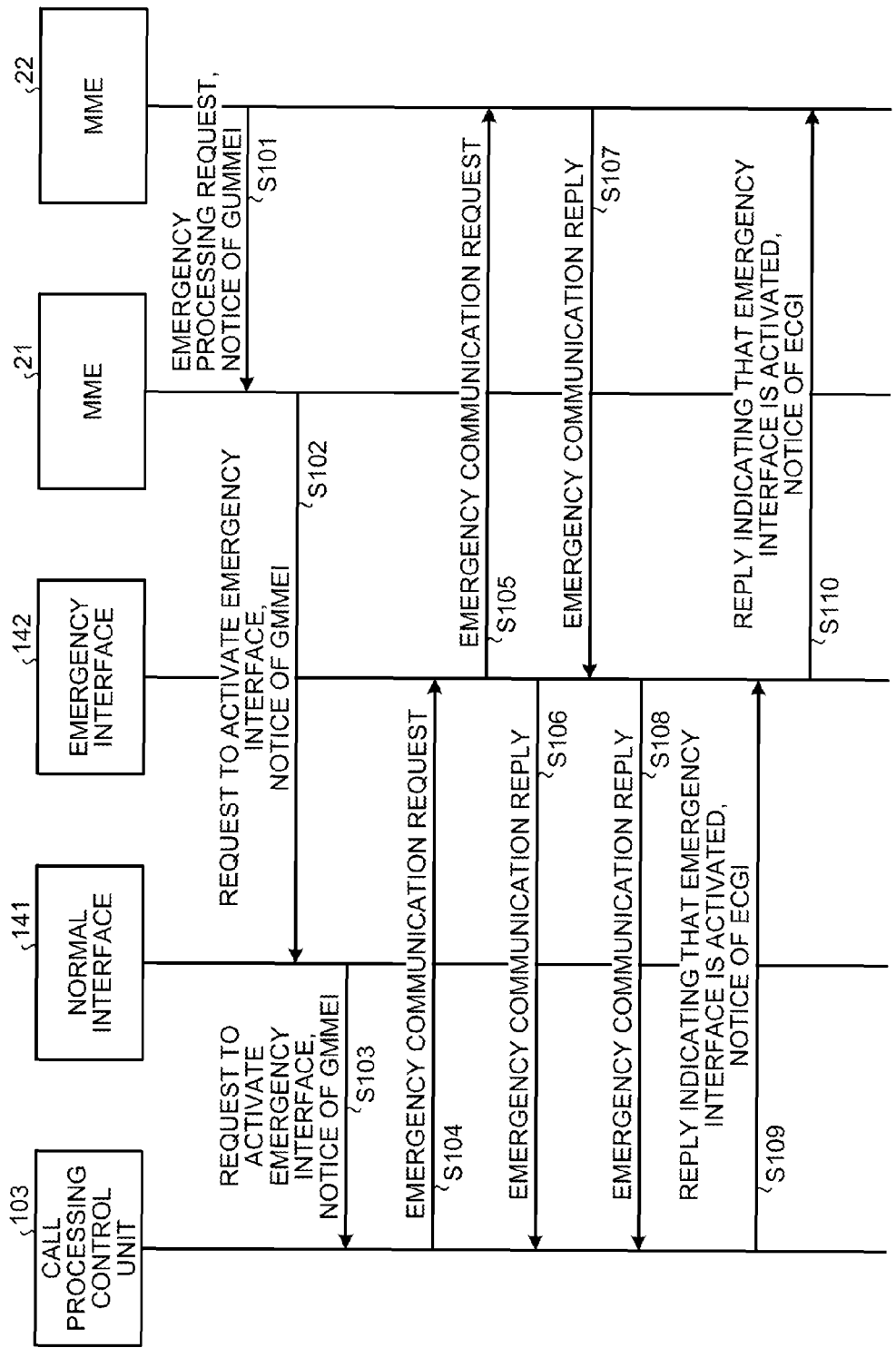
FIG. 4 is a sequence diagram for activating an emergency interface.

Next, with reference to FIG. 4, a sequence to activate the emergency interface 142 will be described. FIG. 4 is a sequence diagram for activating the emergency interface.

Herein, a case will be described in which the services of the base station devices 11b to 13b of the second carrier are stopped due to a disaster. Specifically, the MME 22 in FIG. 4 belongs to the communication system of the second carrier where a fault has occurred, and the call processing control unit 103, the normal interface 141, the emergency interface 142, and the MME 21 belong to the communication system of the first carrier that provides emergency services. In the description below, the call processing control unit 103, the normal interface 141, and the emergency interface 142 will be simply described without indication of belonging to the base station devices 11a to 13a.

The MME 22, when the services of the base station devices 11b to 13b are stopped due to a disaster, sends an emergency processing request and a notice of a GUMMEI to the MME 21 (Step S101). At this time, the MME 22 also transmits information on the base station devices 11b to 13b to the MME 21.

The MME 21 specifies the base station devices 11a to 13a corresponding to the base station devices 11b to 13b. The MME 21 transmits a request to activate the emergency interface 142 to the normal interface 141, and notifies the normal interface 141 of a GMMEI of the MME (Step S102). The normal interface 141 transfers the request to activate the emergency interface 142 and a notice of the GMMEI of the MME 21 transmitted from the MME 21 to the call processing control unit 103 (Step S103).

The call processing control unit 103 receives the request to activate the emergency interface 142 and the GMMEI of the MME 21. The call processing control unit 103 transmits an emergency communication request to the emergency interface 142 (Step S104).

The emergency interface 142 transmits the emergency communication request to the MME 22 (Step S105), and transmits, to the call processing control unit 103, a reply indicating that emergency communication is available, that is, a reply indicating that the emergency interface 142 is normally activated (Step S106).

The MME 22, upon receiving the emergency communication request, transmits an emergency communication reply, as a reply to the emergency communication request, to the emergency interface 142 (Step S107). The emergency interface 142 transfers, to the call processing control unit 103, the emergency communication reply transmitted from the MME 22 (Step S108).

The call processing control unit 103 transmits a reply indicating that the emergency interface 142 is activated and a notice of the ECGI of the subject base station device to the normal interface 141 (Step S109). The normal interface 141 transfers, to the MME 21, the reply indicating that the emergency interface 142 is activated and the notice of the ECGI transmitted from the call processing control unit 103 (Step S110).

Consequently, activation of the emergency interface 142 is completed, and thereafter, the base station devices 11a to 13a operate as base station devices of the terminal device 50a of the first carrier and the terminal device 50b of the second carrier.

Figure 5:
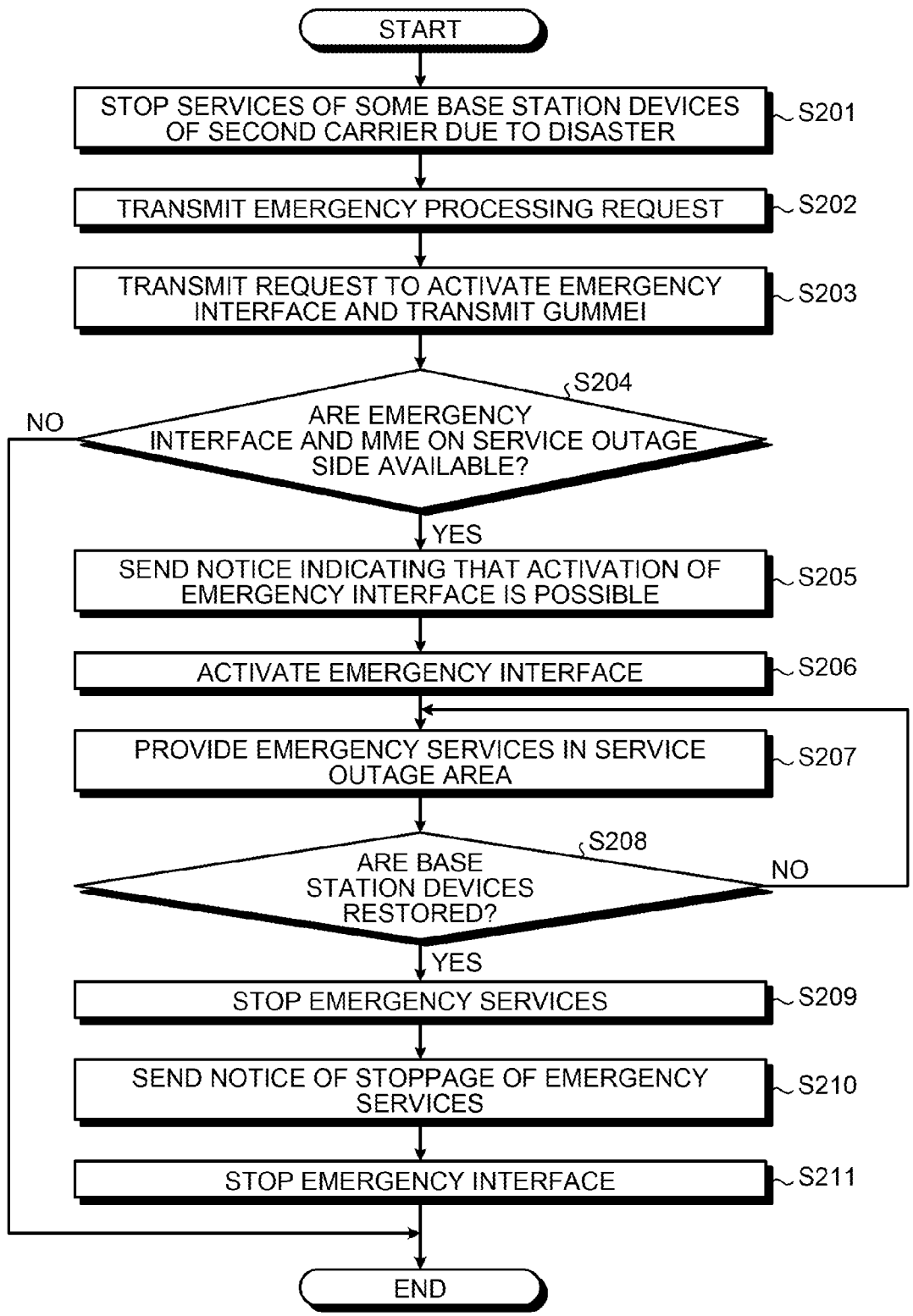
FIG. 5 is a flowchart of a process performed by a communication system according to the first embodiment at the time of a disaster.

Next, with reference to FIG. 5, the flow of a process performed by the communication system according to the first embodiment at the time of a disaster will be described. FIG. 5 is a flowchart of a process performed by the communication system according to the first embodiment at the time of a disaster. Herein, a case will be described in which the base station devices of the second carrier stop providing services due to a disaster.

The services of some of the base station devices 11b to 13b of the second carrier are stopped due to a disaster (Step S201).

The MME 22 transmits an emergency processing request to the MME 21 (Step S202). The MME 22 notifies the MME 21 of the GUMMEI of the MME 22.

The MME 21 receives the emergency processing request and the GUMMEI of the MME 22 from the MME 22. The MME 21 transmits a request to activate the emergency interface 142 to the call processing control unit 103 via the normal interface 141. The MME 21 also transmits the GUMMEI of the MME 22 to the call processing control unit 103 via the normal interface 141 (Step S203).

The call processing control unit 103 receives the request to activate the emergency interface 142 and a notice of the GUMMEI of the MME 22 from the MME 21. The emergency request processing unit 131 of the call processing control unit 103 determines whether the emergency interface 142 and the MME 22 that is an MME on a service outage side are available (Step S204). Specifically, the emergency request processing unit 131 transmits an emergency communication request to the MME 22 via the emergency interface 142. Subsequently, the emergency request processing unit 131 determines whether the emergency interface 142 and the MME 22 are available on the basis of whether a reply indicating that emergency communication is available is provided from each of the emergency interface 142 and the MME 22. If the emergency interface 142 or the MME 22 is not available (NO at Step S204), the call processing control unit 103 terminates a process of providing the emergency services.

In contrast, if the emergency interface 142 and the MME 22 are available (YES at Step S204), the emergency request processing unit 131 notifies the MME 21 that activation of the emergency interface 142 is possible (Step S205).

Then, the emergency request processing unit 131 activates the emergency interface 142 (Step S206).

The base station devices 11a to 13a of the first carrier corresponding to the service outage base station devices 11b to 13b of the second carrier provide emergency services in a service outage area of the second carrier corresponding to the communication areas of the service outage base station devices 11b to 13b (Step S207).

The MME 21 determines whether the base station devices 11b to 13b are restored and resume providing the services, on the basis of a notice from the MME 22 (Step S208). If the base station devices 11b to 13b are not restored (NO at Step S208), the base station devices 11a to 13a returns to Step S207.

In contrast, if the base station devices 11b to 13b are restored (YES at Step S208), the MME 21 notifies the call processing control unit 103 of stoppage of the emergency services (Step S209).

The call processing control unit 103 and the emergency request processing unit 131, after the emergency services are stopped, notifies the MMES 21 and 22 of stoppage of the emergency services (Step S210).

Then, the emergency request processing unit 131 stops the emergency interface 142 (Step S211).

As described above, when a communication service by a base station device of a certain carrier is stopped due to a major disaster or the like, the wireless communication system and the base station device according to the first embodiment provide the communication service via a base station device of a different carrier that covers the communication area. Therefore, even when a major disaster or the like occurs, the wireless communication system and the base station device according to the first embodiment can promptly and continuously provide a wireless communication service to subscribers of a carrier in which provision of services is stopped.

Further, it is not necessary to deploy a new base station device or a repeater as a countermeasure against a disaster. Therefore, it is possible to reduce costs of countermeasures against a disaster and ensure the continuity of communication services at the time of a disaster with efficient capital investment.

Furthermore, in the first embodiment, a case has been described in which the terminal device has a multi-band function or a multi-carrier function. However, conversely, if a terminal device supports only a single frequency band, it may be possible to cause a base station device to support frequency bands of a plurality of carriers. In this case, a base station device that receives an emergency processing request is set so as to perform transmission and reception at the frequency of the requested carrier.

[b] Second Embodiment

Figure 6:
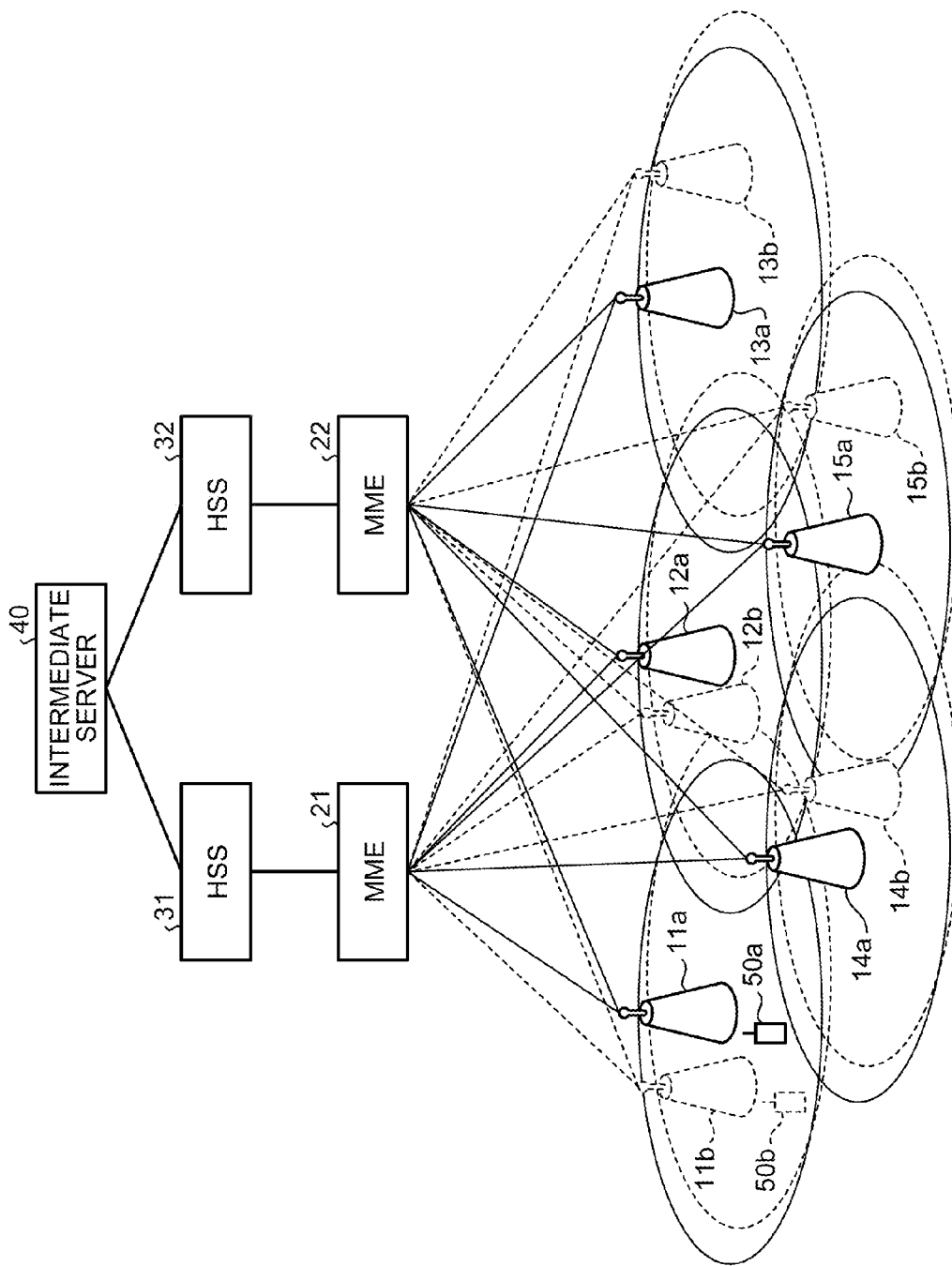
FIG. 6 is a system configuration diagram of a wireless communication system according to a second embodiment.

FIG. 6 is a system configuration diagram of a wireless communication system according to a second embodiment. The wireless communication system according to the second embodiment includes, in addition to the configuration of the first embodiment, an intermediate server 40 provided between the communication system of the first carrier and the communication system of the second carrier.

The wireless communication system according to the second embodiment differs from the first embodiment in the following points. Specifically, the wireless communication system according to the second embodiment transfers, to a different carrier, user information on a certain carrier including a base station device that has stopped providing services. The wireless communication system according to the second embodiment causes a terminal device located in the communication area of the base station device that has stopped a service to perform communication by using a communication system of the different carrier.

The base station devices 11a to 15a and 11b to 15b, the MMES 21 and 22, and the HSSs 31 and 32 have the same functions as those of the first embodiment. Hereinafter, explanation of the same devices and the same functions of the units as those of the first embodiment will be omitted. In the description below, a case will be described in which the communication system of the first carrier, which includes the base station devices 11a to 15a, the MME 21, and the HSS 31, and the communication system of the second carrier, which includes the base station devices 11b to 15b, the MME 22, and the HSS 32, are provided. Further, a case will be described in which the base station devices 11b to 13b have stopped providing services in the communication system of the second carrier.

Functions according to the second embodiment are implemented when the functions to provide an emergency service as described in the first embodiment are not available. For example, the functions are implemented when it is possible to add a wireless resource of a different carrier to the base station devices 11a to 13a that take over the services but it is difficult to establish a connection relationship with a higher-level node device of the different carrier.

The intermediate server 40 connects the HSS 31 belonging to the communication system of the first carrier and the HSS 32 belonging to the communication system of the second carrier.

Figure 7:
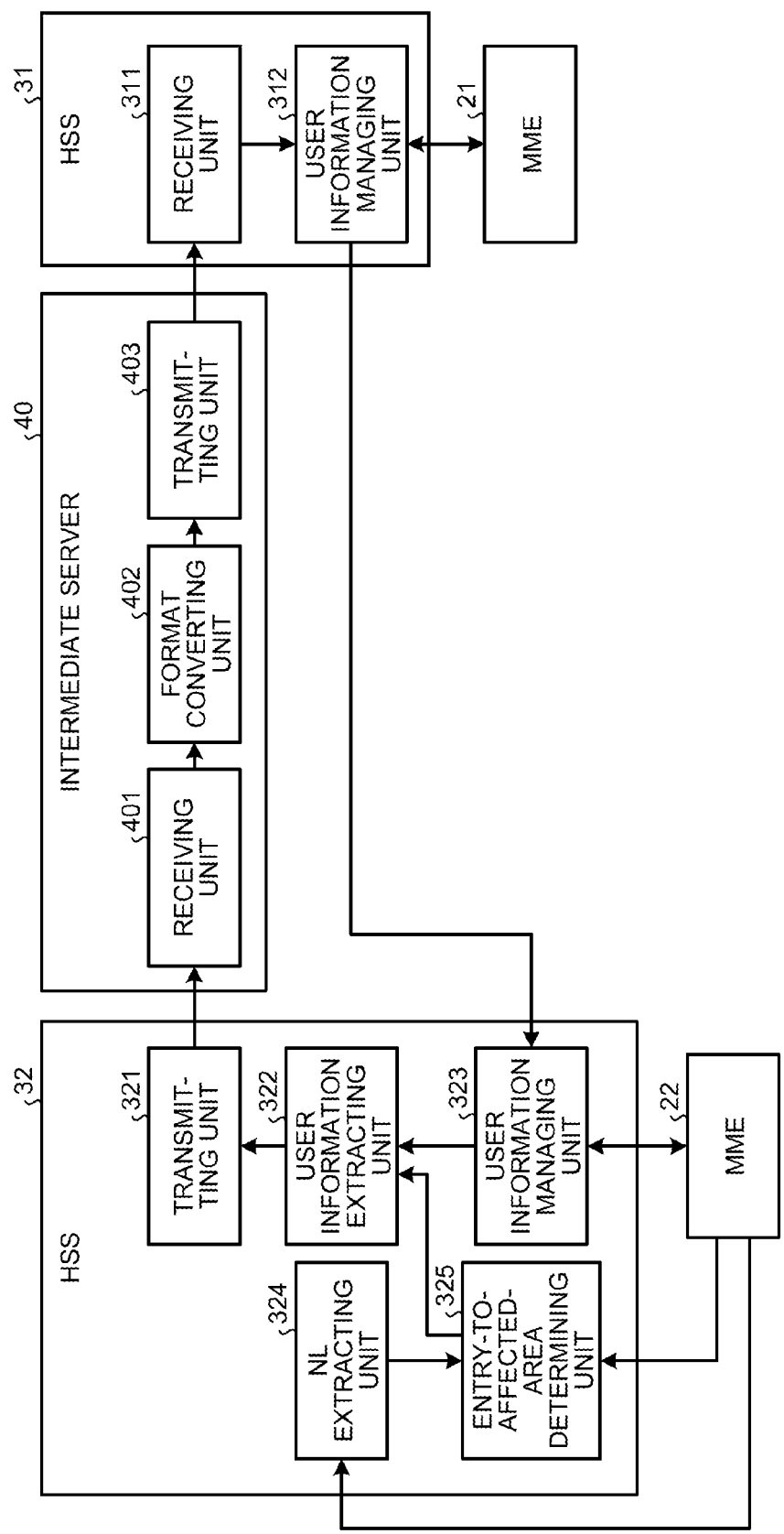
FIG. 7 is a block diagram of an intermediate server and an HSS.

FIG. 7 is a block diagram of the intermediate server and the HSS. The intermediate server 40 according to the second embodiment includes a receiving unit 401, a format converting unit 402, and a transmitting unit 403. The HSS 31 belonging to the first communication system for providing emergency services includes a receiving unit 311 and a user information managing unit 312. The HSS 32 belonging to the second communication system including the base station devices 11b to 13b that have stopped the services includes a transmitting unit 321, a user information extracting unit 322, a user information managing unit 323, a neighbor list (NL) extracting unit 324, and an entry-to-affected-area determining unit 325.

The user information managing unit 323 is a database for managing user information, such as a mobile phone number or a terminal identification number.

Figure 8:
FIG. 8 is a diagram illustrating an example of a subscriber information table.

The user information extracting unit 322 stores therein, as a subscriber information table 202 illustrated in FIG. 8, information on subscribers who use the communication system of the second carrier, for example. FIG. 8 is a diagram illustrating an example of the subscriber information table.

In the subscriber information table 202, an International Mobile Subscriber Identity (IMSI) as an identification number of a subscriber is registered in association with a subscriber name. Further, in the subscriber information table 202, a tracking area (TA: a location registration area) in which the terminal device 50b is located, and Global Positioning System (GPS) location information indicating a current location of the terminal device 50b are registered in association with the subscriber name. In the second embodiment, a case will be described in which the GPS location information is provided; however the GPS location information need not be provided.

Figure 9:
FIG. 9 is a diagram illustrating an example of a base station information table.

Further, the user information extracting unit 322 stores therein a base station information table 203 illustrated in FIG. 9, for example. FIG. 9 is a diagram illustrating an example of the base station information table. In the base station information table 203, a cell Identification (ID) of each base station device and a TA in which each base station device is deployed are registered in association with a base station device belonging to the communication system of the second carrier including the base station devices 11b to 15b.

When the base station devices 11b to 13b stop providing services, the user information extracting unit 322 specifies the terminal device 50b located in an area corresponding to the communication areas of the base station devices 11b to 13b by using the subscriber information table 202 and the base station information table 203. For example, the user information extracting unit 322 specifies TAs corresponding to the base station devices 11b to 13b from the base station information table 203. In the example in FIG. 9, the user information extracting unit 322 specifies "a" and "b" as the TAs corresponding to the base station devices 11b to 13b. Then, the user information extracting unit 322 extracts entries of the terminal device 50b located in the specified TAs from the subscriber information table 202. In the example in FIG. 8, the TAs of subscribers A to C are "a" and "b"; therefore, the user information extracting unit 322 extracts entries of the terminal device 50b as illustrated in FIG. 10. FIG. 10 is a diagram illustrating an example of extraction of terminal devices controlled by the service outage base station device.

In the second embodiment, the terminal device 50b controlled by the base station devices 11b to 13b that have stopped providing services is extracted based on the TA; however, a method of extracting the terminal device 50b is not limited to this example. For example, if pieces of the GPS location information on the terminal devices 50b are collected in the second communication system, the user information extracting unit 322 may narrow down the terminal devices 50b controlled by the base station devices 11b to 13b that have stopped providing services, by using the pieces of the GPS location information. If the communication areas of the base station devices 11b to 13b are within a range at the latitude of 137° to 139° and the longitude of 34° to 36°, the user information extracting unit 322 may extract entries of the terminal devices 50b located within the range at the latitude and the longitude as described above. For example, in the example in FIG. 8, the user information extracting unit 322 extracts entries corresponding to the subscribers A and B as illustrated in FIG. 11. FIG. 11 is a diagram illustrating another example of extraction of terminal devices controlled by the service outage base station device.

The user information extracting unit 322 acquires user information on the extracted terminal device from the user information managing unit 323. Then, the user information extracting unit 322 outputs the acquired user information to the transmitting unit 321.

Further, the user information extracting unit 322 receives, from the entry-to-affected-area determining unit 325, information on the terminal device 50b that has entered an area corresponding to the communication areas of the base station devices 11b to 13b after the base station devices 11b to 13b have stopped providing services. The user information extracting unit 322 acquires, from the user information managing unit 323, user information on the terminal device 50b received from the entry-to-affected-area determining unit 325. Then, the user information extracting unit 322 outputs the acquired user information to the transmitting unit 321.

The NL extracting unit 324 stores therein information on a communication cell of each of the base station devices 11b to 15b of the second communication system. The NL extracting unit 324 receives, from the MME 22, information on the base station devices 11b to 13b that have stopped providing services. The NL extracting unit 324 extracts a neighboring base station device having a neighboring cell of the base station devices 11b to 13b. The neighboring base station device includes, for example, the base station devices 14b and 15b.

The NL extracting unit 324 outputs the information on the extracted neighboring base station device to the entry-to-affected-area determining unit 325.

The entry-to-affected-area determining unit 325 receives input of the information on the neighboring base station device from the NL extracting unit 324. Further, the entry-to-affected-area determining unit 325 receives, from the MME 22, registration of a location of the terminal device 50b located near an affected area. The entry-to-affected-area determining unit 325 determines whether the terminal device 50b for which registration of the location has been received moves from the communication cell of the neighboring base station device to an area corresponding to the communication cells of the base station devices 11b to 15b. If the terminal device 50b moves from the communication cell of the neighboring base station device to the area corresponding to the communication cells of the base station devices 11b to 15b, the entry-to-affected-area determining unit 325 outputs information on the terminal device 50b to the user information extracting unit 322.

The transmitting unit 321 receives, from the user information extracting unit 322, the user information on the terminal device 50b located in the area corresponding to the communication areas of the base station devices 11b to 15b. Then, the transmitting unit 321 transmits the received user information to the receiving unit 401 of the intermediate server 40.

The receiving unit 401 receives, from the transmitting unit 321 of the HSS 32, the user information on the terminal device 50b located in the area corresponding to the communication areas of the base station devices 11b to 15b. The receiving unit 401 outputs the received user information to the format converting unit 402.

The format converting unit 402 receives input of the user information from the receiving unit 401. The format converting unit 402 changes a format, such as an item or an order, of the user information from the format of the second carrier to the format of the first carrier. Subsequently, the format converting unit 402 outputs the user information in the changed format to the transmitting unit 403.

The transmitting unit 403 receives, from the format converting unit 402, input of the user information, which is in the changed format and which is about the terminal device 50*b* located in the area corresponding to the communication areas of the base station devices 11*b* to 15*b*. Then, the transmitting unit 403 transmits the received user information to the receiving unit 311 of the HSS 31.

The receiving unit 311 receives, from the transmitting unit 403, the user information on the terminal device 50*b* located in the area corresponding to the communication areas of the base station devices 11*b* to 15*b*. The receiving unit 311 stores the received user information in a database in the user information managing unit 312.

The user information managing unit 312 stores, in the database, the user information which is about the terminal device 50*b* located in the area corresponding to the communication areas of the base station devices 11*b* to 15*b* and which is received from the receiving unit 311. Subsequently, upon receiving a notice of deletion of the user information on the terminal device 50*b* of the second carrier from the MME 21, the user information managing unit 312 deletes the user information on the terminal device 50*b* of the second carrier from the database. Subsequently, the user information managing unit 312 notifies the user information managing unit 323 of the HSS 32 that the user information is deleted.

The MME 21, upon receiving a connection request from the terminal device 50*b* located in the area corresponding to the communication areas of the base station devices 11*b* to 15*b*, performs authentication by using the user information in the database in the user information managing unit 312.

The user information on the terminal device 50*b* located in the area corresponding to the communication areas of the base station devices 11*b* to 15*b* is stored in the user information managing unit 312; therefore, the terminal device 50*b* is authenticated by the MME 21 and is able to perform communication by using the communication system of the first carrier.

Further, upon receiving a notice of restoration of the base station devices 11*b* to 13*b* from the MME 22, the MME 21 notifies the HSS 32 of deletion of the user information on the terminal device 50*b* of the second carrier.

Figure 12:
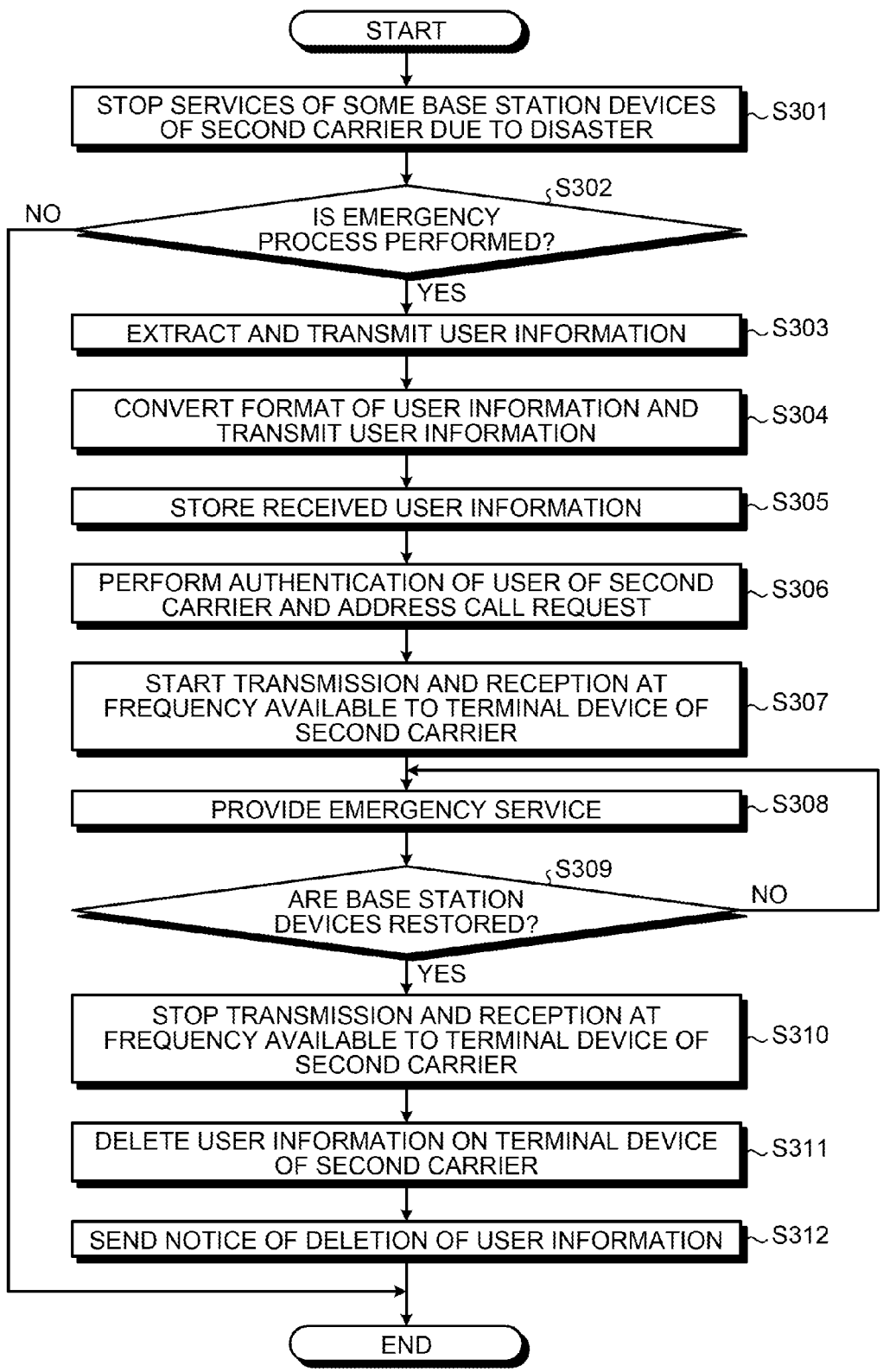
FIG. 12 is a flowchart of a process including transfer of user information, which is performed by the wireless communication system according to the second embodiment at the time of a disaster.

Next, with reference to FIG. 12, the flow of a process including transfer of the user information, which is performed by the wireless communication system according to the second embodiment at the time of a disaster will be described. FIG. 12 is a flowchart of the process including transfer of user information, which is performed by the wireless communication system according to the second embodiment at the time of a disaster.

The services of some of the base station devices 11*b* to 13*b* of the second carrier are stopped due to a disaster (Step S301).

The HSS 32 determines whether to perform an emergency process (Step S302). For example, the HSS 32 determines to perform the emergency process when the HSS 32 receives, from the MME 22, information on a failure in the process of emergency services in the method as described in the first embodiment, such as a failure in connection to the base station devices 11*a* to 15*a* of the first carrier. If the emergency process is not to be performed (NO at Step S302), the HSS 32 terminates the process at the time of a disaster.

In contrast, if the emergency process is to be performed (YES at Step S302), the user information extracting unit 322 extracts the user information on the terminal device 50*b* located in the area corresponding to the communication areas of the base station devices 11*b* to 15*b*. Then, the user information extracting unit 322 transmits the user information on the terminal device 50*b* located in the area corresponding to the communication areas of the base station devices 11*b* to 15*b* to the intermediate server 40 via the transmitting unit 321 (Step S303).

The format converting unit 402 of the intermediate server 40 converts the format of the user information, which is about the terminal device 50*b* located in the area corresponding to the communication areas of the base station devices 11*b* to 15*b* and which is received from the HSS 32, into the format of the first carrier. Then, the format converting unit 402 transmits the user information in the converted format to the HSS 31 via the transmitting unit 403 (Step S304).

The user information managing unit 312 of the HSS 31 stores, in the database, the user information which is about the terminal device 50*b* located in the area corresponding to the communication areas of the base station devices 11*b* to 15*b* and which is received from the HSS 32 (Step S305).

The MME 21 performs authentication of the user of the second carrier and addresses a call request (Step S306).

The base station devices 11*a* to 13*a* start transmission and reception at a frequency available to the terminal device 50*b* of the second carrier (Step S307).

The communication system of the first carrier provides an emergency service to the terminal device 50*b* of the second carrier, by using the user information on the terminal device 50*b* of the second carrier located in the area corresponding to the communication areas of the base station devices 11*b* to 13*b* belonging to the HSS 31 (Step S308).

The MME 21 determines whether the base station devices 11*b* to 13*b* are restored (Step S309). If the base station devices 11*b* to 13*b* are not restored (NO at Step S309), each of the devices of the communication system of the first carrier returns to Step S308.

In contrast, if the base station devices 11*b* to 13*b* are restored (YES at Step S309), the base station devices 11*a* to 13*a* stop transmission and reception at the frequency available to the terminal device 50*b* of the second carrier (Step S310).

The user information managing unit 312 of the HSS 31 deletes the user information on the terminal device 50*b* of the second carrier from the database (Step S311).

Then, the user information managing unit 312 notifies the user information managing unit 323 of deletion of the user information (Step S312).

Figure 13:
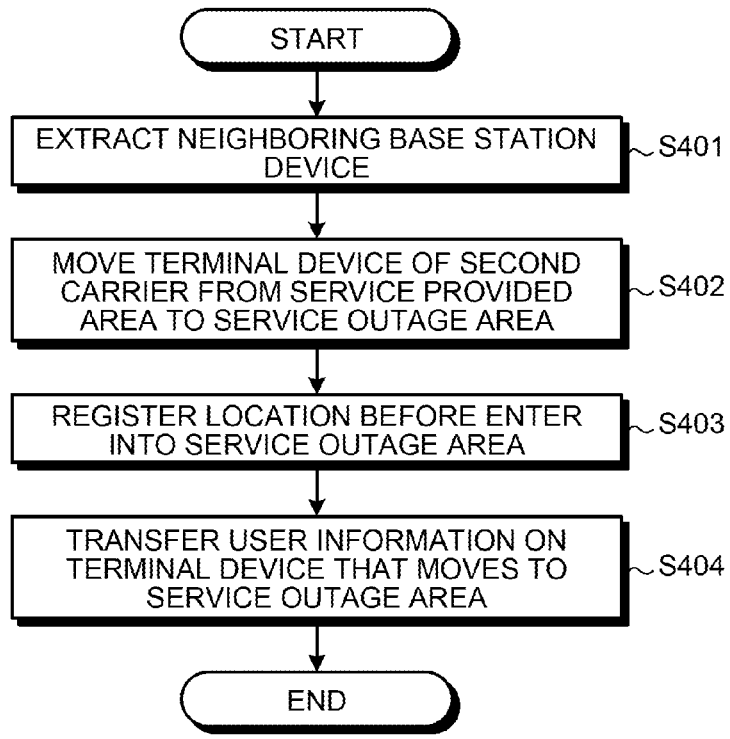
FIG. 13 is a flowchart of a process performed by the communication system according to the second embodiment when a terminal device enters a service outage area after a disaster.

Next, with reference to FIG. 13, the flow of a process performed by the communication system according to the second embodiment when a terminal device enters a service outage area after a disaster will be described. FIG. 13 is a flowchart of a process performed by the communication system according to the second embodiment when a terminal device enters a service outage area after a disaster.

The NL extracting unit 324 extracts a neighboring base station device of the base station devices 11*b* to 13*b* that have stopped services (Step S401).

The terminal device 50*b* of the second carrier moves from a service provided area to a service outage area (Step S402). At this time, before the terminal device 50*b* enters the service outage area, the entry-to-affected-area determining unit 325 receives registration of the location of the terminal device 50*b* from the MME 22 (Step S403).

The entry-to-affected-area determining unit 325 specifies the terminal device 50*b* that moves to the service outage area, on the basis of information on the registration of the location. The entry-to-affected-area determining unit 325 transmits, to the user information extracting unit 322, the information on the terminal device 50b that moves to the service outage area. The user information extracting unit 322 acquires, from the user information managing unit 323, the user information on the terminal device 50b that moves to the service outage area. The user information extracting unit 322 transfers the user information on the terminal device 50b that moves to the service outage area to the HSS 31 via the intermediate server 40 (Step S404).

In the second embodiment, only the user information on a terminal device located in the communication area of a base station device that has stopped a service; however, for example, it may be possible to temporarily disclose all pieces of user information to other carriers when the base station device has stopped providing a service. In this case, it is not necessary to take special measures for a terminal device that enters the communication area of a base station device after the base station device has stopped providing a service.

As described above, when a base station device stops providing a service, the wireless communication system according to the second embodiment transfers user data of a terminal device located in the communication area of the base station device to a different carrier. Then, the different carrier, by using own communication network, provides the service to the user located in the communication area of the base station device that has stopped providing the service. Therefore, for example, even when it is difficult to provide an emergence service by the method of the first embodiment, it is possible to provide a wireless communication service to subscribers of a carrier in which a service is continuously stopped.

Hardware Configuration

Figure 14:
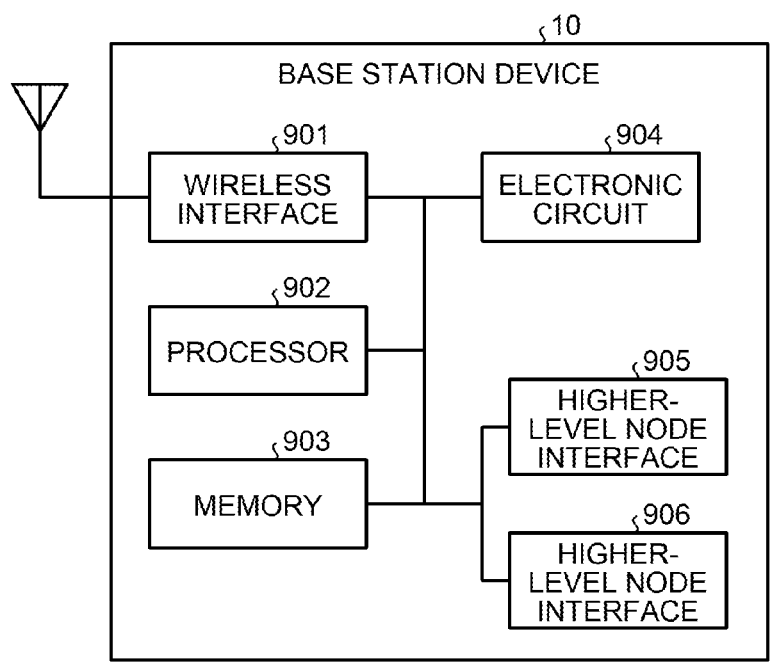
FIG. 14 is a hardware configuration diagram of a base station device.

FIG. 14 is a hardware configuration diagram of the base station device. The base station device 10 includes a wireless interface 901, a processor 902, a memory 903, an electronic circuit 904, and higher-level node interfaces 905 and 906.

The wireless interface 901, the memory 903, the electronic circuit 904, and the higher-level node interfaces 905 and 906 are connected to the processor 902 via a bus.

The wireless interface 901 and the electronic circuit 904 implement the functions of the wireless communication unit 101 illustrated in FIG. 2.

The higher-level node interface 905 implements the functions of the normal interface 141 illustrated in FIG. 2. The higher-level node interface 906 implements the functions of the emergency interface 142 illustrated in FIG. 2.

The memory 903 stores therein various programs including a program that implements the functions of the call processing control unit 103 and the emergency request processing unit 131.

The processor 902 reads and executes the various programs from the memory 903, thereby implementing the functions of the call processing control unit 103 and the emergency request processing unit 131 illustrated in FIG. 2, for example.

Figure 15:
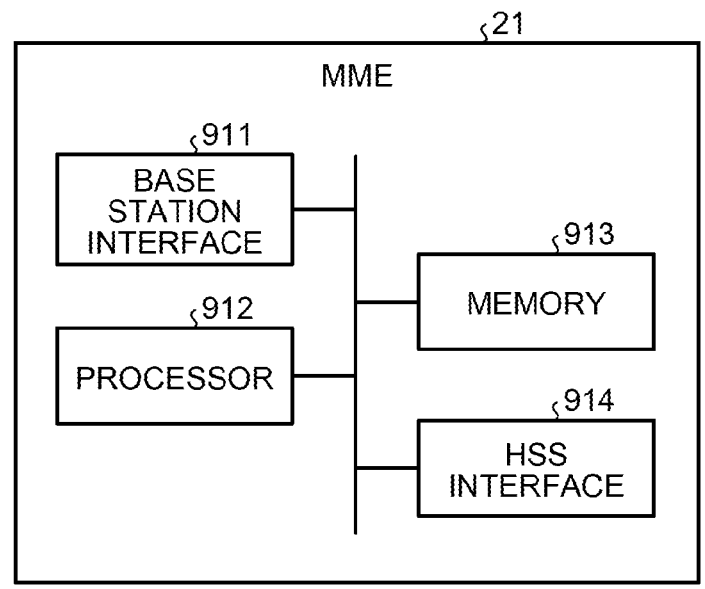
FIG. 15 is a hardware configuration diagram of an MME.

FIG. 15 is a hardware configuration diagram of an MME. Herein, the MME 21 will be described as an example. The MME 21 includes a base station interface 911, a processor 912, a memory 913, and an HSS interface 914.

The base station interface 911, the memory 913, and the HSS interface 914 are connected to the processor 912 via a bus.

The base station interface 911 is a communication interface with the base station device 10. The HSS interface 914 is a communication interface with the HSS 31.

The memory 913 includes various programs including a program that implements the functions described in the first and the second embodiments.

The processor 912 reads and executes the various programs from the memory 913, thereby implementing various functions of the MME 21 described in the embodiments.

Figure 16:
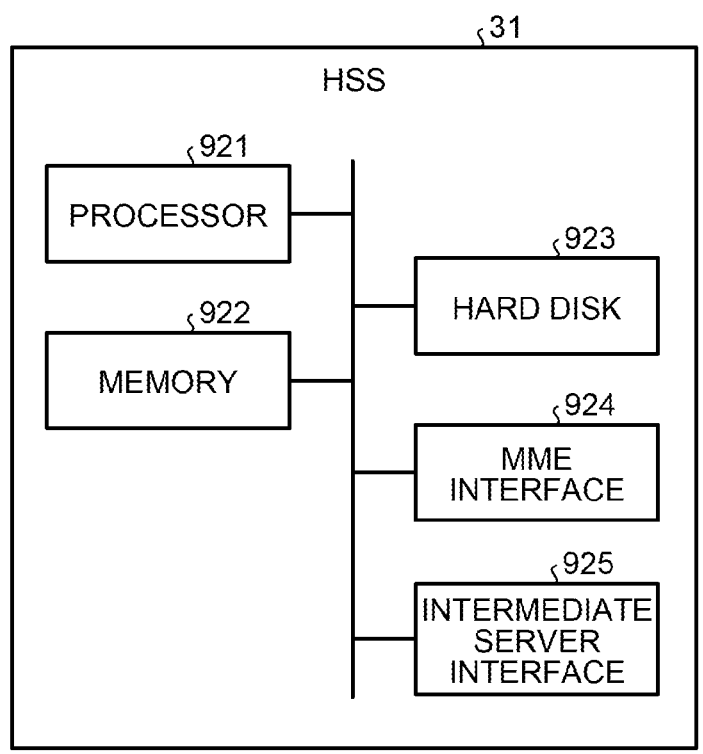
FIG. 16 is a hardware configuration diagram of an HSS.

FIG. 16 is a hardware configuration diagram of an HSS. Herein, the HSS 31 will be described as an example. The HSS 31 includes a processor 921, a memory 922, a hard disk 923, an MME interface 924, and an intermediate server interface 925.

The memory 922, the hard disk 923, the MME interface 924, and the intermediate server interface 925 are connected to the processor 921 via a bus.

The MME interface 924 is a communication interface with the MME 21. The intermediate server interface 925 is a communication interface with the intermediate server 40. However, the HSS 31 according to the first embodiment need not include the intermediate server interface. The intermediate server interface 925 implements the functions of the transmitting unit 321 and the receiving unit 311 illustrated in FIG. 7.

The hard disk 923 stores therein, for example, various programs including a program for implementing the functions of the user information extracting unit 322, the user information managing unit 323, the NL extracting unit 324, the entry-to-affected-area determining unit 325, and the user information managing unit 312 illustrated in FIG. 7. Further, the hard disk 923 stores therein a database of the user information managed by the user information managing unit 323.

The processor 921 and the memory 922 read and execute various programs in the hard disk 923, thereby implementing the functions of the user information extracting unit 322, the user information managing unit 323, the NL extracting unit 324, the entry-to-affected-area determining unit 325, and the user information managing unit 312, for example.

Figure 17:
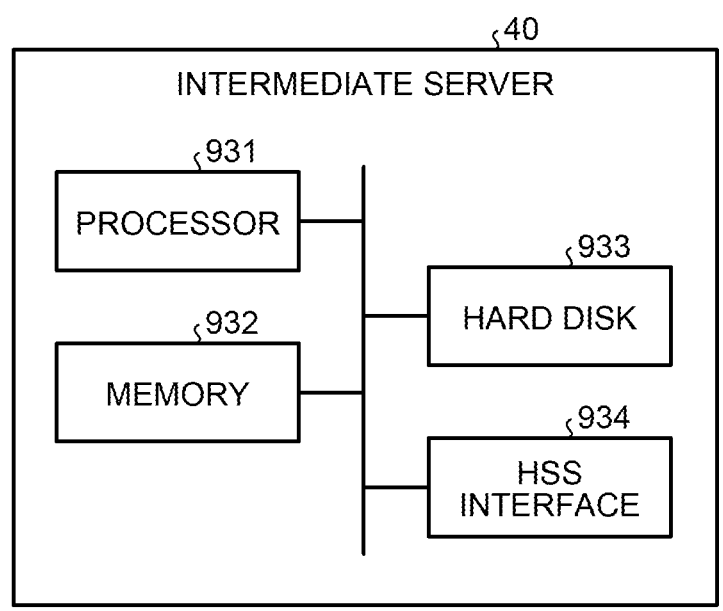
FIG. 17 is a hardware configuration diagram of an intermediate server.

FIG. 17 is a hardware configuration diagram of the intermediate server. The intermediate server 40 includes a processor 931, a memory 932, a hard disk 933, and an HSS interface 934.

The memory 932, the hard disk 933, and the HSS interface 934 are connected to the processor 931 via a bus.

The HSS interface 934 is a communication interface with the HSSs 31 and 32. The HSS interface 934 implements the functions of the receiving unit 401 and the transmitting unit 403 illustrated in FIG. 7.

The hard disk 933 stores therein various programs including a program that implements the functions of the format converting unit 402 illustrated in FIG. 7, for example.

The processor 931 and the memory 932 read and execute the various programs in the hard disk 933, thereby implementing the functions of the format converting unit 402, for example.

According to an embodiment of the base station device, the wireless communication system, and the method of controlling the base station device disclosed in the present application, it is possible to continuously provide a wireless communication service.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising:
    a first interface unit connected to a first communication network;
    a second interface unit connected to a second communication network;
    a communication control unit that establishes communication with the first communication network by using the first interface unit, and upon receiving a communication request using the second communication network from the first communication network, activates the second interface unit and establishes communication with the second communication network by using the second interface unit; and
    a communicating unit that communicates with a first terminal device using the first communication network, connects the first terminal device to the first communication network via the first interface unit, and when the communication control unit receives the communication request, communicates with a second terminal device using the second communication network, and connects the second terminal device to the second communication network via the second interface unit in addition to connection of the first terminal device to the first communication network.

2. The base station device according to claim 1, wherein the communication control unit stops the second interface unit upon receiving a request to stop communication using the second communication network, and
    the communication unit stops communication with the second terminal device.

3. The base station device according to claim 1, wherein the communication unit copes with both of communication using a frequency band used in the first communication network and communication using a frequency band used in the second communication network.

4. The base station device according to claim 1, wherein the communication unit copes with only communication using a frequency band used in the first communication network, and communicates with the second terminal device by using a communication function using a frequency band used in the second communication network of the second terminal device.

5. A wireless communication system comprising:
    a first base station device provided in a first communication network;
    a first higher-level node device provided in the first communication network; and
    a second higher-level node device provided in a second communication network, wherein
    the first base station device includes:
        a first interface unit connected to the first communication network;
        a second interface unit connected to the second communication network;
        a communication control unit that establishes communication with the first communication network by using the first interface unit, and upon receiving a communication request using the second communication network from the first higher-level node device, activates the second interface unit and establishes communication with the second communication network by using the second interface unit; and
        a communicating unit that communicates with a first terminal device using the first communication network, connects the first terminal device to the first communication network via the first interface unit, and when the communication control unit receives the communication request, communicates with a second terminal device using the second communication network, and connects the second terminal device to the second communication network via the second interface unit in addition to connection of the first terminal device to the first communication network, and
    the first higher-level node device includes:
        a notifying unit that receives a request to use the first base station device from the second higher-level node device, and sends a notice of the communication request to the communication control unit of the first base station device designated by the request.

6. The wireless communication system according to claim 5, further comprising:
    a second base station device provided in the second communication network, wherein
    when a fault occurs in the second base station device, the second higher-level node device transmits, to the first higher-level node device, a request to use the first base station device corresponding to the second base station device in which the fault has occurred.

7. The wireless communication system according to claim 5, further comprising:
    an intermediate server that transfers user information on the second terminal device acquired from the second higher-level node device to the first higher-level node device; and
    a user information extracting unit that, when a fault occurs in the second base station device, transmits the user information on the second terminal device located in a communication area corresponding to a communication area of the second higher-level node device to the intermediate server, wherein
    the first higher-level node device authenticates the first terminal device by using user information on the first terminal device provided in advance, and upon occurrence of a fault in the second base station device, acquires the user information on the second terminal device from the intermediate server, and authenticates the second terminal device by using the acquired user information on the second terminal device, and
    the communication control unit establishes communication using the first communication network for a terminal authenticated by the first higher-level node device.

8. The wireless communication system according to claim 7, wherein
    the second higher-level node device further includes an additional information notifying unit that, when the second terminal device moves from an outside to an inside of a communication area of the second base station device in which a fault has occurred, transmits user information on the second terminal device to the intermediate server, and
    the first higher-level node device authenticates the user information received from the additional information notifying unit via the intermediate server, in addition to the user information that has already been received.

9. A method of controlling a base station device that includes a first communication interface connected to a first communication network and that includes a second communication interface connected to a second communication network, the method comprising:

when not receiving a communication request using the second communication network,
connecting a first terminal device to the first communication network via the first communication interface; and when receiving a communication request using the second communication network from the first communication network,
activating the second communication interface;
connecting the first terminal device to the first communication network via the first communication interface; and
connecting a second terminal device using the second communication network to the second communication network via the second communication interface.

* * * * *